Figure 1:
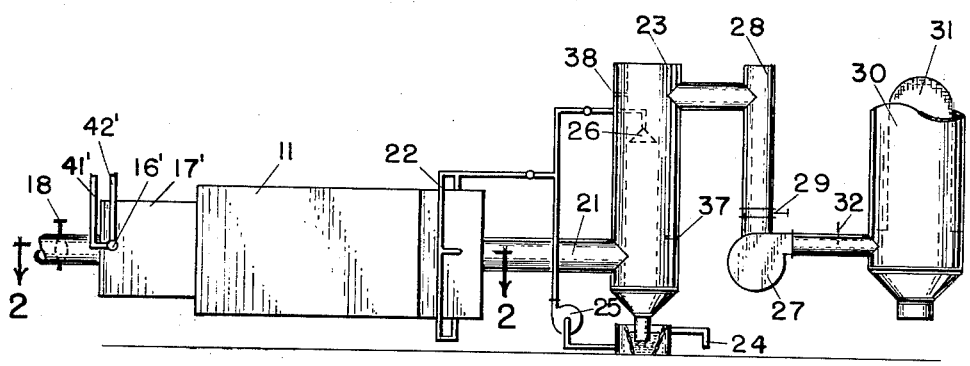

July 24, 1962  I. WILLIAMS  3,046,095
PROCESS FOR CARBON BLACK PRODUCTION
Filed Jan. 13, 1958

IRA WILLIAMS
INVENTOR

BY *Oly Silverman*

ATTORNEY 3,046,095
PROCESS FOR CARBON BLACK PRODUCTION
Ira Williams, Borger, Tex., assignor to J. M. Huber Corporation, Locust, N.J., a corporation of New Jersey
Filed Jan. 13, 1958, Ser. No. 708,640
3 Claims. (Cl. 23—209.4)

My invention relates to improvements in methods of producing carbon black from gaseous hydrocarbons and it relates particularly to the production of finely divided carbon particles of very small and controlled size by the decomposition of such vaporizable hydrocarbon-containing materials as natural gas, coke-oven gas, still gases, petroleum fractions, naphtha, kerosene, propane, butane, benzene, xylene, naphthalene and the like. I have developed a process with high yield and which yields a product useful in rubber to an extent heretofore not expected.

The production of carbon by the thermal decomposition of hydrocarbons, generally, is old in the art and is illustrated in United States Patents 1,276,487 and 1,383,674. These processes consist essentially in heating a regenerative refractory mass in the form of a checkerwork by passing hot mixtures of gases—usually combustion gases—therethrough until a high temperature of that mass is achieved. Thereafter the combusting high-temperature heating mixture is replaced by the hydrocarbon from which the carbon is to be produced. The hydrocarbon decomposes principally to carbon and hydrogen on passage through the hot regenerative mass. The resultant mixture of gas and carbon is passed through cooling and collecting means and the carbon there collected. The process of decomposition is continued only until the temperature of the regenerative mass has been reduced to a point where decomposition of the hydrocarbon gas into carbon and hydrogen is inefficient, after which the blasting of the regenerative mass with the combustible heating mixture is resumed. Known processes are either intermittent and so impose a variable load on the collecting equipment which reduces their efficiency and the grade of the product, or require complicated switching of the gases from multiple furnaces through the collecting systems. These types of furnaces must also contain an extensive checkerwork to produce complete decomposition of the carbon in those checkerworks and such checkerworks are frequently fouled by carbon deposits which are expensive to remove.

The efficiency of the prior art thermal carbon process in terms of pounds of carbon thereby produced per 1,000 cubic feet of gas treated has been offset by the poor grade of black thereby obtained, the conventional thermal blacks being distinctly coarse and less useful in rubbers than the more finely divided channel and furnace blacks.

Since the Szarvasey patent (U.S. Patent 1,383,674) it has been accepted by the art (e.g. U.S. Patent 1,880,512) that increased quantities of diluents were necessary during dissociation to obtain proper fine size of carbon particles for incorporation into rubber, as by rolls, and to prevent carbon deposits on the checkerwork, not withstanding the fact that the use of diluents during dissociation increases the heat requirements for dissociation of the hydrocarbon gas. It has also been previously thought that if carbon black remained at high temperature after its formation from hydrocarbon decomposition, it would deteriorate in quality. I have found that this is not so if dilution is performed while the carbon is in large part still in what may be regarded as a "nascent" state.

My invention, broadly, comprises the steps of passing hydrocarbon gas into a high temperature zone where it is rapidly heated to decompose it to carbon and to hydrogen. Diluting gases are preferably substantially absent at this step, whereby the thermal efficiency of the process is improved. The hot treated hydrocarbon gas mixture and its decomposition products are then quickly transferred to a zone where they are admixed with a diluent gas. The carbon particles that are formed in the thermal decomposition step are consequently separated and are hindered from coming into contact with each other while they are at the high temperature at which they exit from the hydrocarbon decomposition zone. This separation of the particles in their hot state facilitates the production of a high quality, finely divided, product.

More specifically, I have discovered that an improved quality of carbon black is economically, conveniently and efficiently produced by an improved thermal decomposition process. My process, broadly, comprises a first step of thermal decomposition of hydrocarbon in hydrocarbon-containing gases to produce carbon by passage of such gas through a first hot regenerative mass in a first chamber followed by admixture of the carbon-carrying gaseous product thus produced, in another chamber adjacent that first regenerative mass, with a substantial volume of relatively inert gases. These inert gases may comprise gases formed by combustion, as of a fuel gas or of the hydrocarbon-containing gases, and used to heat a second regenerative mass in a second separate combustion chamber concurrent with the passage of the hydrocarbon-containing gas through the first regenerative mass in order to heat said second regenerative mass to a temperature at which the hydrocarbon in said hydrocarbon-containing gases passing therethrough may be efficiently decomposed to form carbon black. This first step (of thermal decomposition of hydrocarbon in the first chamber and regenerative mass heating in the second chamber) terminates, and the second step of heating the regenerative mass in the first chamber and decomposing hydrocarbon in hydrocarbon-containing gas in the second chamber begins when the first regenerative mass reaches an undesirably low temperature for efficient production of carbon black. Thereupon the heating of the regenerative mass in the second chamber is discontinued and the hydrocarbon-containing gases used to produce the carbon black are passed through the said heated second regenerative mass while the first regenerative mass is heated, as by a combustible mixture such as used to heat the second regenerative mass, to a temperature at which the first regenerative mass may subsequently again efficiently decompose the hydrocarbon-containing gas. The gases produced during the heating of said first regenerative mass are passed into a chamber adjacent to the second regenerative mass where they mix with the hot mixture of carbon black and gases produced in and exiting from the previously heated second regenerative mass. The carbon so produced is collected at a relatively even rate.

An object of this invention is the provision of a novel process for the production of carbon black.

Another object of this invention is the provision of a novel apparatus for the production of carbon black.

A further object of this invention is to provide a continuous process for the production of carbon black which gives a uniform flow of gases through the collecting equipment.

Yet another object of this invention is to provide an improved process for the production of thermal decomposition carbon.

A still further object is to provide a furnace of smaller construction and employing a smaller amount of checkerwork.

Other objects and advantages of this invention will be apparent to those skilled in the art during the course of the following description.

Figure 2:
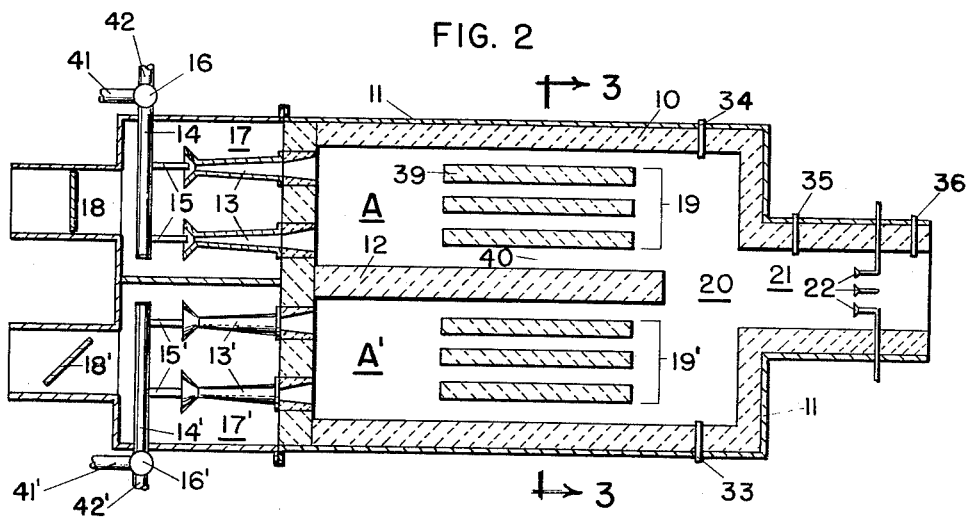
Figure 3:
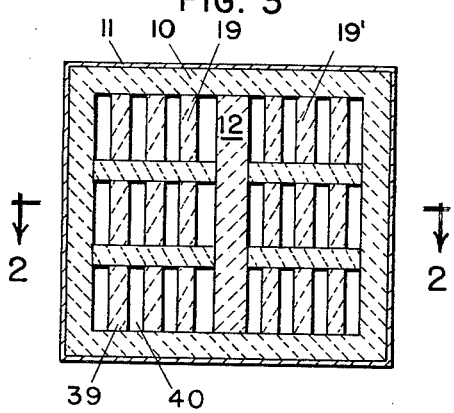

In the accompanying drawing, forming a part of this specification, and in which like numerals are employed to designate like parts throughout the same:

FIGURE 1 is an overall diagrammatic view of apparatus embodying my invention,

FIGURE 2 is central longitudinal horizontal section through a preferred form of apparatus embodying my invention, this section being taken along line 2—2 of FIGURES 1 and 3, and FIGURE 3 is a transverse section taken through the checkerwork on the line 3—3 of FIGURE 2.

According to the embodiment of my invention illustrated in the drawings, I place two similar furnaces as A and A' in parallel and connect them to a common outlet chamber 20. Each furnace contains checkerwork 19 and 19' as described below. Independent control of the amount of air and the amount of hydrocarbon or of combustion gases or both fed to each furnace is provided. The hot gases from each furnace are commingled in chamber 20 before these carbon-laden gases are passed to collecting equipment 23, 28 and 30.

The furnace walls are constructed of refractory material 10 and enclosed in a metal jacket 11. Two furnaces A and A' are separated by the partition 12. Each furnace is supplied with a plurality of burners, as 13 and 13' which in turn are supplied with fuel through manifolds 14 and 14' and nozzles 15 and 15'. The supply to each set of burners is controlled as by metering valves 16 and 16' which valves may each feed varying amounts of either hydrocarbon containing gas for decomposition from line 42 or 42' or other fuel for combustion from line 41 or 41' or both together, to their respective burners. Air for the burners is supplied from plenum chambers, as 17 and 17', which in turn are supplied with air by compressors (not shown) and such air supply is controlled, as by valves 18 and 18'. FIGURE 2 shows the valves 18 and 18' in position for heating furnace A' and forming carbon black in furnace A.

In starting the operation, a combustible fuel mixture is ignited and burned against the refractory checkerwork 19 and 19' until that checkerwork is heated to a temperature sufficient to efficiently decompose the hydrocarbon in a hydrocarbon-containing gas to carbon black. This will usually be 1400 or 1500° C. The air is then cut off from furnace A and the flow of the hydrocarbon-containing gas to furnace A is increased as by adjusting valve 16. Carbon black and hydrogen are then formed in furnace A and exit from the checkerwork 19 into mixing chamber 20. Here the carbon-laden gas mixture from checkerwork 19 rapidly mixes with and is diluted by the hot combustion gas exiting from furnace A' and checkerwork 19'. These hot gases heat treat the carbon produced in chamber A to drive off and decompose any material on the surface thereof and help to complete the decomposition of undecomposed hydrocarbons in said mixing chamber. These hot combustion gases may contain such amounts of oxygen, carbon monoxide, and carbon dioxide as may be desired. These amounts may be controlled by providing either an excess of oxygen over the amount required to completely burn the hydrocarbon in the gas used as fuel or by providing a deficiency of oxygen for that purpose. This addition of gas also so dilutes the carbon-laden gases as to separate adjacent particles of carbon exiting from the checkerwork 19. This hinders and prevents their agglomeration. The thus-formed mixture of carbon-laden gases passes into the exit tube 21 where they may be cooled by water sprays, as 22, and in spray chamber 23 (supplied by a water source 24 and pump 25 to spray water, as at 25 and 22, to cool the hot gases and quench incandescent carbon) before passing into the collecting means. A pump 27 at the foot of a downcomer 28 with a slide valve 29 may control gas velocities through the system of burner and cooler and collector. A bag filter 30 of a conventional design, as 31, collects the carbon. The temperature at the filter, measured as at thermometer well 32, may be controlled at 150° C. Other conventional cooling and collecting equipment such as shown in United States Patents 1,520,115 or 1,911,003 or 1,987,643 may be used in place of the specific equipment above described.

This decomposition of hydrocarbon to form carbon black is continued for a half-cycle—i.e., until the temperature of the checkerwork in furnace A has been reduced to an inefficient decomposition temperature for the hydrocarbon being employed; air is then introduced into furnace A and the gases fed to that furnace adjusted, as at valves 16 and 18, to heat that checkerwork again to a temperature sufficient to efficiently decompose to carbon black the hydrocarbon in the hydrocarbon-containing gas. When the operation of furnace A is changed from hydrocarbon decomposition to checkerwork heating, the feed to furnace A' is changed so as to decompose hydrocarbon in furnace A'; i.e., the air is simultaneously cut off from the furnace A', as by valve 18', and the hydrocarbon supply increased, as by means of valve 16', to provide the proper hydrocarbon decomposition conditions in chamber A' to there form carbon black. This hydrocarbon decomposition to form carbon black is continued for another half-cycle, i.e., until the temperature of the checkerwork in furnace A' has been cooled to an inefficient cracking temperature for the hydrocarbon being employed; air is then introduced and the gases adjusted, as at valves 16' and 18' to heat that checkerwork to a temperature sufficient to again efficiently decompose to carbon black the hydrocarbon in the hydrocarbon-containing gas. When the operation of furnace A' is changed from hydrocarbon decomposition to checkerwork heating, the feed to furnace A is changed so as to decompose hydrocarbon in that furnace, i.e., the air is cut off from furnace A, as by valve 18, and the hydrocarbon supply increased, as by means of valve 16, to again provide the proper hydrocarbon decomposition conditions to form carbon black in chamber A, which chamber A has been heated to the proper temperature while hydrocarbon decomposition was occurring in chamber A'. This complete cycle is repeated continuously to provide a uniform flow of carbon-laden gas through the collecting equipment and to produce a heat treated thermal decomposition carbon. Thermocouple wells, indicated at 33, 34, 35, 36, 37 and 38, provide for measurement of the temperature of the gas stream emerging from the refractory tube work.

The valves as 16, 16', 18 and 18' which control the amounts and ratios of the air, hydrocarbon gas to be decomposed, and gas to be used for heating are shown in the drawings for purpose of simplicity of representation as separately and manually operated. These valves may, of course, be either linked together by conventional mechanical means or a gang switch may electrically actuate a plurality of such valves to coordinate their actions to simply insure a reliable repeated sequence of operation. These gang switches in turn may be actuated manually or automatically to insure simple repetitive action and substantially continuous carbon black production. Thus, the electrical or mechanical gang switch may be actuated by the temperature level of the gases exiting from each checkerwork where combustion to heat such checkerwork is occurring so as to controllably bring the temperature of that checkerwork up to the desired hydrocarbon decomposition temperature according to a definite program. This program is chosen to alternate the operation of each furnace as above described when the temperature in the decomposition furnace will have fallen to a predetermined temperature range and to bring the temperature of the other checkerwork up to proper hydrocarbon decomposition temperature by that time. Further, these valves and the heating of the regenerative masses also may be controlled by the temperature of the gases exiting from the checkerwork in which the hydrocarbon-containing gases are undergoing decomposition and the furnace operation automatically alternated when the temperature of such gases falls below the temperature of efficient carbon black formation. The use of conventional control and coordinating devices whereby to accomplish the above automatic actuation of such valves is within the scope of my invention.

The operation of the process and the structural details of the apparatus in the following examples embodying a preferred example of my apparatus and process is illustrated by reference to the figures.

EXAMPLE 1

A furnace was constructed as in FIGURE 2 in which the two parallel reaction tubes A and A' were 9 inches wide and 16 inches high. The checkerwork 19 and 19' started 30 inches down stream from the burners and extended for a distance of 54 inches. Twelve inches beyond the end of the checkerwork the tubes entered a common chamber 20 where the gases mixed. This chamber was 24 inches wide, 16 inches high and 14 inches long. The exit from this chamber was 16 inches high and 12 inches wide. The furnace shell 10 and partition 12 were formed of firebrick such as 9" x 4" x 2½" brick; the regenerative masses 19 and 19' were formed of splits, such as 9" x 4" x 1¼" firebrick indicated as 39. Water sprays entered the top of the tube 21 at various points along its length for cooling the carbon-laden gases. After the furnace was brought to an operating temperature of 1250° C., 15.5 cubic feet per minute of natural gas from the Panhandle field in Texas was decomposed to form carbon black in one furnace (A), with 0.9 second contact time with the checkerwork, while the other furnace (A') was being heated by burning 7.5 cubic feet of that natural gas with 65 cubic feet of air. The operation was continued for about 4½ minutes until the temperature of the checkerwork in furnace A had dropped to 1140° C. after which the decomposition and heating operations were switched and repeated in the opposite furnace. Each such complete cycle of operation was approximately nine minutes long. The carbon-laden gases were sprayed with water and cooled to 160° C. at a distance of 6 feet from the entrance end of exit tube 21. The yield of carbon collected was 8.7 pounds per 1,000 cubic feet of the total natural gas consumed (measured at 60° F. and 760 mm. Hg absolute pressure). The narrow width (1¼") of the passages, 40, which are 54" long and 9" high in this particular apparatus, through the hot regenerative masses permits the gases passing therethrough to be heated substantially evenly throughout the volume thereof without requiring convoluted or irregular pathways in which carbon deposits may be formed. The pasasgeways, as 40, provide straight line paths for the gas passing through each regenerative mass and the passageway walls are parallel to the line of flow of said gas to avoid reentrant angles and projections into the path of the decomposing hydrocarbon gases. This, in turn, lessens the tendency for carbon deposits to form. The absence of such carbon deposits in the passages through the regenerative masses improves heat transfer during the decomposition of the hydrocarbon-containing gases and prevents the accumulation of relatively large agglomerates of carbon which will be blown through the passageways and into chamber 20 during the heating of the regenerative mass by combustion gases and produce an undesirable proportion of large particles of carbon in the finished product.

The carbon produced by the procedure of the above example was tested in a compound containing 100 parts smoked sheet rubber, 50 parts carbon, 5 parts zinc oxide, 3 parts sulfur, 3 parts stearic acid and 1 part of mercaptobenzothiazole.

The compound was vulcanized at 260° F. with the following results:

Table 1

| Minutes of Cure | Lbs. per Sq. In. Load at Elongation of— | | Lbs. Tensile Per Sq. In. | Percent Elongation at Break |
|---|---|---|---|---|
| | 500% | 600% | | |
| 15 | 880 | 1,550 | 3,160 | 763 |
| 30 | 1,340 | 2,280 | 3,810 | 718 |
| 45 | 1,520 | 2,580 | 3,940 | 705 |
| 60 | 1,660 | 2,820 | 3,960 | 690 |

These figures show the product to be an excellent grade of thermal decomposition carbon.

*Example 2*

The experiment of Example 1 was repeated in which the heating was done with 7.5 cubic feet of natural gas and 65 cubic feet of air, but the natural gas to be cracked was replaced with 375 cubic centimeters of natural gasoline which was vaporized before being injected into the furnace. In this case the cracking operation was continued until the checkerwork temperature had been reduced to 1100° C. The complete operating cycle was 10 minutes. The yield was 4 pounds of carbon per gallon of gasoline used. The carbon was almost completely free of any benzene extractable material.

The temperature to which the checkerwork may fall before carbon black formation becomes inefficient depends on the nature of the hydrocarbon being decomposed. Many higher molecular weight hydrocarbons such as pentane and heptane and especially unsaturated hydrocarbons decompose at a lower temperature than methane and with the absorption of less heat. However, during the process of decomposition such materials form new hydrocarbon substances by the combination of radical fragments and such new substances may require high temperatures for decomposition. Checkerwork temperatures below 1,000 degrees centigrade are usually unsatisfactory and permit large amounts of undecomposed hydrocarbon material to pass through the checkerwork. If the amount is excessive it may not be decomposed by mingling with the hot combustion gases in the chamber 20 and the resulting carbon will contain much absorbed organic material which will produce a brown stain in light colored rubber.

The necessary time of exposure of the hydrocarbon vapors to the hot checkerwork depends on the temperature but is usually between about 0.25 and 2 seconds, altho somewhat longer exposure does not seem to be harmful.

The gas to be decomposed is preferably natural gas from which the normally liquid hydrocarbons have been removed and the gas may preferably consist mostly of hydrocarbons containing not more than two carbon atoms in the molecule. While I have disclosed the use of only natural gas and natural gasoline in the examples, any vaporizable hydrocarbon, such as the exemplary materials disclosed above at column 1, paragraph 1, of this specification, may be employed for decomposition to produce carbon black. In case the hydrocarbon boils at too high a temperature the manifold and portions of the burner may require heating. Further, the fuel used for the combustible mixture to heat the regenerative mass to the temperature required for hydrocarbon decomposition to carbon black and the decompositon stock which is decomposed to carbon black by passage through the hot regenerative masses may be the same or different. Burning of heavy oil, for instance can be successfully used for heating. In this case separate provision is usually necessary for introduction of the cracking or decomposition stock. Thus, while the furnace operation above described in the examples uses the hydrocarbon gas from which the carbon is produced by decomposition also as the combustion gas with which to heat up the regenerative masses, it is clearly within the scope of my invention to use different combustible fluids and/or gases for the formation of carbon and for the checkerwork heating. Thus, gases or liquids of a mixture of both, different from those used to decompose to form carbon, may be used to provide the heat to bring the regenerative mass to appropriate temperature, and may be introduced into the manifold 14 and 14′ via separate fuel lines 41 and 41′.

The temperature in the regenerative masses 19, 19′ and the cycle time are functions, inter alia, of gas rate. Temperature of carbon formation may also be controlled by variation of cycle time.

Contact time on hot refractories may be controlled by variation in volume rate of cracking gas fed to the furnace. By shortening the complete cycle time, as to four and five minutes, the carbon black is formed when the furnace temperatures are highest and the change of temperature of the regenerative mass at a minimum. This is feasible in this apparatus because of the ease and rapidity with which one or the other of the regenerative masses may be connected to produce carbon. The apparatus of this invention may be operated so that no very substantial change of temperature of the regenerative masses occurs between beginning and end of each half-cycle, such as might deleteriously affect the quality of the carbon produced, because the cycles may be made relatively short, and the change-over rapid. This also reduces the tendency for carbon to precipitate on and to block the passages of the regenerative masses.

It is to be understood that the forms of my invention herewith shown and described are to be taken as preferred examples of the same and that various changes may be made therein without departing from the spirit of my invention as expressed in the subjoined claims.

Having thus described my invention, I claim:

1. A process for the continuous production of finely divided thermal decomposition carbon comprising the steps of heating a checkerwork of refractory material in a furnace by means of burning a mixture of hydrocarbon fuel and air passing through the furnace and checkerwork from the inlet end to the outlet end thereof producing a relatively inert combustion gas, simultaneously passing a hydrocarbon gas through a previously heated adjacent similar furnace from the inlet end to the outlet end thereof with the hydrocarbon gas decomposing to form thermal carbon, mixing the products from both furnaces in a mixing chamber communicating with the outlet end of both furnaces to thereby dilute the decomposed gas and reduce the agglomeration of the thermal carbon entrained therein, continuing the operation until the checkerwork in the second furnace is reduced in temperature but remains sufficiently high to cause thermal decomposition, simultaneously changing the flow of hydrocarbon gas to the inlet end of the first furnace and the flow of hydrocarbon fuel and air to the inlet end of the second furnace and repeating such cycle to provide a continuous process.

2. The process of claim 1 including the steps of cooling the mixed products of the furnaces and collecting the thermal carbon produced thereby.

3. The process of claim 1 including the steps of cooling the mixed products of the furnaces by quenching water sprays adjacent the mixing chamber and collecting the thermal carbon produced by the furnaces.

References Cited in the file of this patent

UNITED STATES PATENTS

| | | |
|---|---|---|
| Re. 19,664 | Damon | Aug. 13, 1935 |
| 1,540,541 | Calvin | June 2, 1925 |
| 1,880,512 | Spear | Oct. 4, 1932 |
| 1,925,131 | Brownlee | Sept. 5, 1933 |
| 2,144,971 | Heller et al. | Jan. 24, 1939 |
| 2,630,378 | Gee | Mar. 3, 1953 |
| 2,643,182 | Williams | June 23, 1953 |
| 2,779,664 | Sweitzer | Jan. 29, 1957 |